United States Patent [19]
Gerich et al.

[15] 3,707,199
[45] Dec. 26, 1972

[54] RECREATIONAL VEHICLE
[72] Inventors: Anton J. Gerich; Howard W. Bletz; Merle P. Wilfing, all of c/o BGW Industries Inc., Box 1683, Mansfield, Ohio 44907
[22] Filed: Jan. 11, 1971
[21] Appl. No.: 105,384

[52] U.S. Cl. .................................180/5, 280/6.11
[51] Int. Cl. .............................................B62m 27/00
[58] Field of Search..........280/6, 6.11; 180/5, 9.24 A

[56] References Cited

UNITED STATES PATENTS

| | | | |
|---|---|---|---|
| 3,583,507 | 6/1971 | Trautwein | 180/9.24 A |
| 3,309,097 | 3/1967 | Seeber | 280/6.11 |
| 2,905,479 | 9/1959 | Schomers | 280/16 |

FOREIGN PATENTS OR APPLICATIONS 986,197   7/1951   France..............................180/9.24 A Primary Examiner—Albert J. Makay
Assistant Examiner—John Mannix
Attorney—McNenny, Farrington, Pearne and Gordon

[57] ABSTRACT

Recreational vehicles are disclosed which are particularly suitable on snow or ice. The vehicles include a main frame on which the rider sits and a power unit connected to the main frame for pivotal movement about a longitudinal axis. Therefore, the rider may remain upright when passing over laterally sloping terrain or may lean into turns. Footrests are provided on each side of the longitudinal axis to provide rider stability without requiring the rider to place his feet on the ground. In one embodiment wheels are driven directly by the engine without an intermediate clutch, and the traction of the wheels is controlled by the operator's foot pressure on the power unit frame.

4 Claims, 5 Drawing Figures

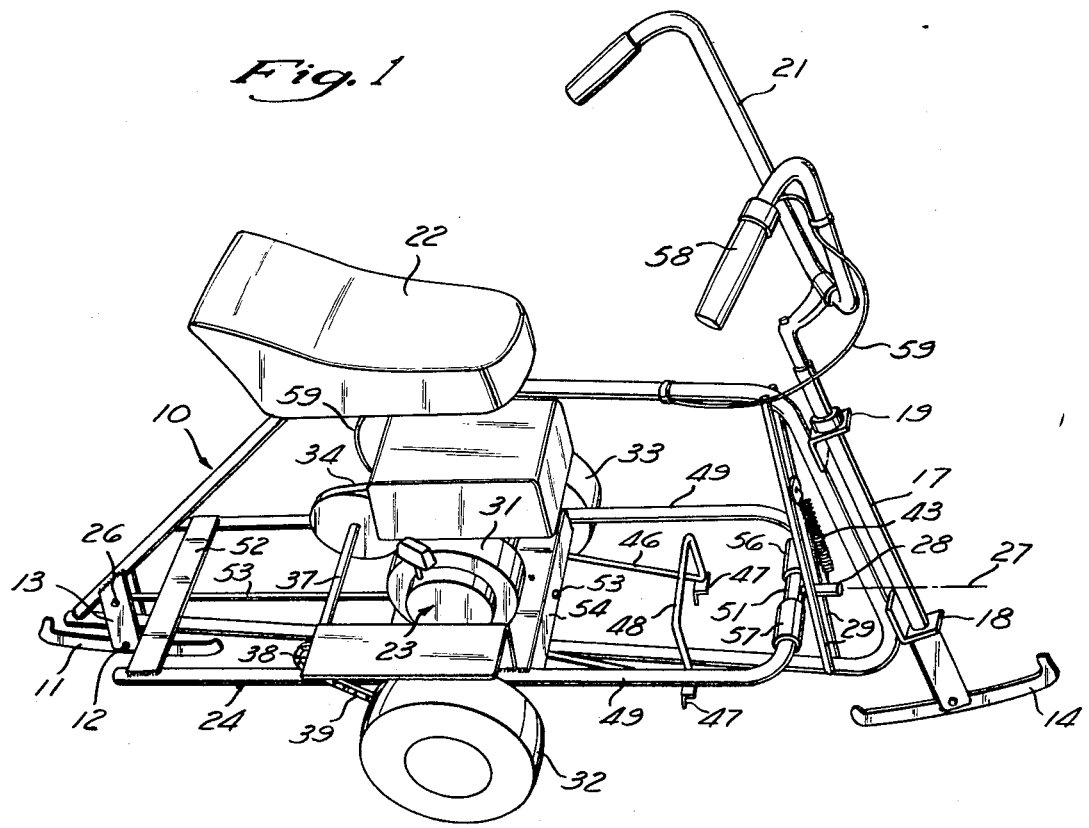

INVENTORS
ANTON J. GERICH,
HOWARD W. BLETZ,
& MERLE P. WILGING
BY
McNENNY, FARRINGTON, PEARNE & GORDON
ATTORNEYS

RECREATIONAL VEHICLE

BACKGROUND OF THE INVENTION

This invention relates generally to off-the-road vehicles, and more particularly to a recreational vehicle adapted to operate on ice or snow.

PRIOR ART

Various types of ice or snow recreational vehicles are known. Generally, such vehicles, when intended to operate only on ice, are provided with ice-skate type support elements. When intended to operate on snow, such vehicles are often provided with a powered track and skis. In many of the later type of vehicles, generally known as snowmobiles, the lateral position of the vehicle is determined by the level of the ground over which the vehicle is passing, and there is no provision to permit the vehicle to remain upright when passing over sloping terrain or to lean into turns. Consequently, such vehicles tend to require a high degree of skill to prevent them from tipping over. With such vehicles it is often necessary for the operator to place his feet on the ground to maintain stability. This can produce injuries, particularly when the vehicle is operating at higher speeds. Examples of such vehicles are illustrated in the U.S. Pat. Nos. 2,827,971 and 2,970,662.

Other prior art vehicles provide means which compensate for nonlevel terrain or permit the vehicle to lean into turns. An example of such vehicle is illustrated in the U.S. Pat. No. 2,475,250. This vehicle is inherently unstable and requires the operator to place his feet on the ground when the operation of the vehicle is such as to require increased stability.

SUMMARY OF THE INVENTION

Two embodiments of this invention are illustrated. The first embodiment is intended primarily for operation on ice, and the second embodiment is intended for operation on snow.

The first embodiment provides a main frame on which the operator sits. Front and back ice-skate type elements are mounted on the main frame with the front skate being steerable. A power unit is pivotally connected to the main frame so that the power unit and the main frame can rotate with respect to each other about a longitudinal axis. Therefore, the main frame can be tipped either way with respect to the power unit to allow the rider to lean into turns in the manner in which a bicycle is ridden. The power unit, however, is provided with a traction wheel on each side of the longitudinal axis so its position is determined by the terrain over which the vehicle is passing.

The pivotal connection between the main frame and the power unit is also arranged to permit pivotal movement therebetween about a lateral axis adjacent the rearward end of the main frame and to permit relative upward and downward movement between the forward ends of the power unit and main frame about such lateral axis.

A spring is connected to provide a lifting force tending to raise the forward end of the power unit. Consequently, a substantial portion of the weight of the power unit is carried by the skates, and a relatively small load is carried by the traction wheels. A footrest is provided at the forward end of the power unit on each side of the longitudinal axis. When the operator places his feet on the footrest and presses down, an increase load is applied to the traction wheels, and greater traction is achieved.

The spring is arranged so that relatively small amounts of traction are provided when the operator is not pressing down on the forward end of the power unit. Therefore, the wheels can be directly driven by the engine, and it is not necessary to provide a clutch to disengage the drive when the engine is started or when the vehicle is not in motion while the engine is running.

When the operator wishes to start the vehicle after the engine is running, he merely presses down on the footrest to increase the traction of the wheels. When he wishes to stop, he releases the foot pressure and transfers his feet to a brake element. The release of foot pressure reduces the traction of the wheels, and the operation of the brake causes the vehicle to stop.

The location of the footrests on opposite sides of the longitudinal axis provides the operator with laterally spaced foot supports on a stable platform which moves with the vehicle so that the operator can achieve stability without placing his feet on the ground.

In the second embodiment intended for operation primarily on snow, the vehicle is again provided with a main frame on which the operator sits. The rearward end of the frame is supported by a powered track, and the forward end of the frame is supported by a steerable ski. When operation on bare ground is desired, a steerable wheel may be substituted for the ski. The power unit is again pivotally connected to the main frame to accommodate relative rotation between the power unit and the main frame about a longitudinal axis. Here again, the lateral position of the power unit is determined solely by the terrain over which the vehicle is passing, and the main frame is free to pivot with respect to the power unit. Consequently, the operator can ride along a lateral slope while the main frame and, of course, the operator remain in an upright position, even though the power unit tips to conform to the terrain slope. Further, in turns the operator can lean into the turns to maintain proper balance. In this embodiment stabilizing springs are provided which allow the frame to tip with respect to the power unit but provide a spring force tending to maintain the frame upright with respect to the power unit. Here again, footrests are provided on the forward end of the power unit on either side of the longitudinal axis. The traction of the power unit in this embodiment is not controlled by foot pressure, and a clutch is provided to disengage the engine from the track. However, the lateral stability of the operator can be maintained without putting his feet on the ground since his feet rest on a stable platform on the opposite sides of the longitudinal axis.

BRIEF DESCRIPTION OF THE DRAWINGS

FIG. 1 is a perspective view of a first embodiment of a recreational vehicle in accordance with this invention which is particularly suited for operation on ice;

FIG. 2 is a side view of the vehicle shown in FIG. 1 illustrating in phantom the manner in which the power unit and main frame are free for pivotal movement about a lateral axis adjacent the rearward end of the main frame;

DETAILED DESCRIPTION OF THE DRAWINGS

Figure 3:
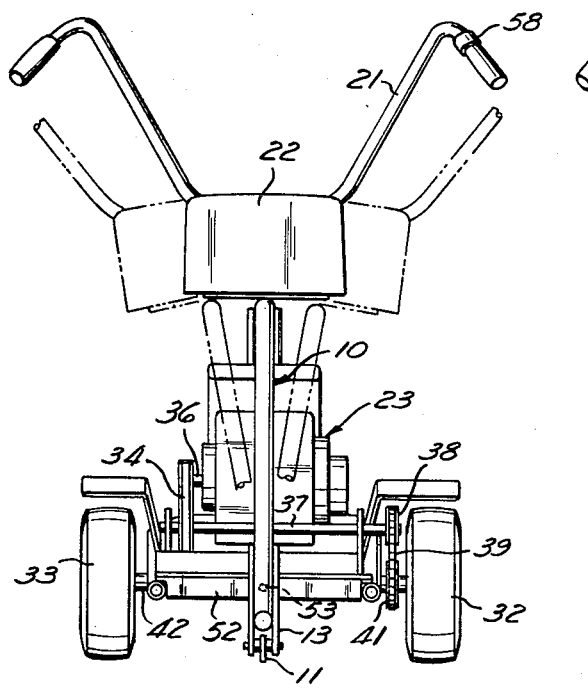
FIG. 3 is a back view of the vehicle shown in FIGS. 1 and 2 illustrating in phantom the manner in which the main frame can be tipped in either direction about the longitudinal axis.

FIGS. 1 through 3 illustrate an embodiment of this invention particularly suited for operation on ice. This vehicle includes a tubular main frame 10 which is supported at its rearward end by a rearward skate 11 pivoted at 12 between side plates 13. The forward end of the frame is supported by a forward skate 14 pivoted at 16 on a steering column 17. The steering column is journaled on angle plates 18 and 19 for rotation about its longitudinal axis. Handle bars 21 are mounted at the upper end of the steering column so the operator can steer the vehicle, and a seat 22 is mounted on the upper side of the frame for the operator.

A power unit 23 is located within the main frame 10 and includes a power unit frame 24 pivoted to the rearward end of the frame 10 by a compound pivot structure which permits pivotal movement about a lateral pivot axis 26 and a longitudinal axis 27. The forward end of the power unit frame is provided with a projection 28 which extends between vertically extending laterally spaced guide rods 29. The projection 28 in cooperation with the guide rods 29 maintains the longitudinal axis 27 in alignment with the main frame while allowing the forward end of the power unit frame to move vertically up or down with respect to the main frame about the pivot axis 26. This pivotal movement is illustrated in FIG. 2 by the phantom view.

The power unit also includes an internal combustion engine 31 connected to drive a pair of laterally spaced traction wheels 32 and 33. In this embodiment a positive or direct drive is provided which does not utilize a clutch. This drive includes a belt 34 which extends between a pulley on the engine output shaft 36 and a pulley on a jackshaft 37. The jackshaft 37 is journaled on the power unit frame 24 and is provided with a chain sprocket 38 at one end. A chain 39 connects the sprocket 38, and a sprocket 41 mounted on the axle 42 that supports the wheels 32 and 33. With this drive the wheels 32 and 33 are rotated whenever the engine is running.

A coil spring 43 is connected between the main frame 10 and the forward end of the power unit frame 24, and the spring 43 adjustably operates to apply a resilient force tending to raise the forward end of the power unit frame. In practice the coil spring 43 is adjusted to apply sufficient upward force to the power unit frame 24 to support a substantial portion of the power unit weight thereby reducing the weight of the power unit supported by the wheels 32 and 33. Consequently, the traction of the wheels on the ice is relatively small unless a force is applied by the operator to the forward end of the frame urging it downwardly with respect to the main frame 10. With this arrangement sufficiently low traction is provided to permit the engine to be started and to run while the vehicle remains stationary, thus eliminating the need of a clutch in the power drive.

A brake element 46 is pivoted on the power unit frame for rotation about a lateral axis (not illustrated) and is provided with brake shoes 47 adapted to engage the ice and resist movement of the vehicle. Preferably, the brake shows 47 are formed of pieces of angle metal which are welded to the brake element 46. A cross portion 48 is provided to permit the operator to press down on the forward end of the brake element 46 to cause the brake shoes 47 to engage the ice with a force determined by the pressure of the operator's foot. A spring (not illustrated) normally maintains the brake shoes 47 in the elevated position illustrated in FIG. 2.

The power unit frame is generally rectangular in shape providing side rails 49 joined at their forward end by a cross portion 51 and at their rearward ends by a cross member 52. The longitudinal pivot structure is provided by a rod 53 which extends through an opening in the cross member 52 and a similar opening in an engine support plane 54 to allow the pivotal movement between the rod 53 and the power unit frame 24 about the longitudinal axis.

Footrests 56 and 57 are provided on the cross portion 51 on either side of the longitudinal axis 27. The operator places his feet on the two footrests 56 and 57 and presses downward to obtain the desired amount of traction between the wheels 32 and 33 and the ice. When the operator wishes to start the vehicle after the engine is running, he places his feet on the footrests and presses downward to increase the traction between the wheels and the ice to start the vehicle. Speed control is provided by a rotating handgrip type throttle 58 which connects to the engine throttle through a cable 59. When the operator wishes to stop the vehicle, he decreases the pressure on the footrests to reduce the traction of the drive wheels and, if necessary, places one or both feet on the brake element 46 to stop the vehicle even though the wheels 32 and 33 continue to rotate.

Because the main frame 10 can pivot with respect to the power unit frame 24 about the longitudinal axis 27, the operator can lean into turns in the same manner as the rider of a bicycle or can remain upright even when riding over a laterally sloping surface. This is illustrated by the phantom views of FIG. 3. Consequently, the lateral position of the power unit 23 is determined by the surface over which the vehicle is passing, but the position of the main frame and, in turn, the rider is not controlled by the slope of the terrain. Since the operator can remain upright or tip as required to maintain his balance, the tendency for the vehicle to tip over is greatly reduced.

Further, since the operator has one foot resting on a footrest on each side of the axis 27, the operator can maintain stability even under skidding conditions or the like. Consequently, it is not necessary for the operator to place his feet on the ground to maintain balance, and the danger of injury is greatly reduced. In effect the power unit provides a stable platform on which the operator's feet are positioned. Such stable platform, because it is on the vehicle and moving with the vehicle, permits the operator to maintain sufficient balance and stability to keep from tipping over. Because the wheels 32 and 33 are substantially spaced on opposite sides of the longitudinal axis 27, the tendency for the power unit to tip over is virtually nonexistent. Such stability is achieved when the power unit is provided with a relatively wide track, a relatively low center of gravity, and when the longitudinal pivot axis is sufficiently low with respect to the track to insure that the line of force applied to the power unit from the main frame intersects the ground within the track width. Further, the power unit frame is sufficiently wide so that the side rails protect the rider's legs from contact with obstacles.

In some instances this embodiment of FIG. 1 may be provided with a clutch in the drive system and studded tires or the like to provide increased traction. In such modification it is still preferable to utilize a spring 43 to permit the operator to control the drive force to some degree. Such an embodiment is utilized where greater traction is desired for quicker starts.

Figure 5:
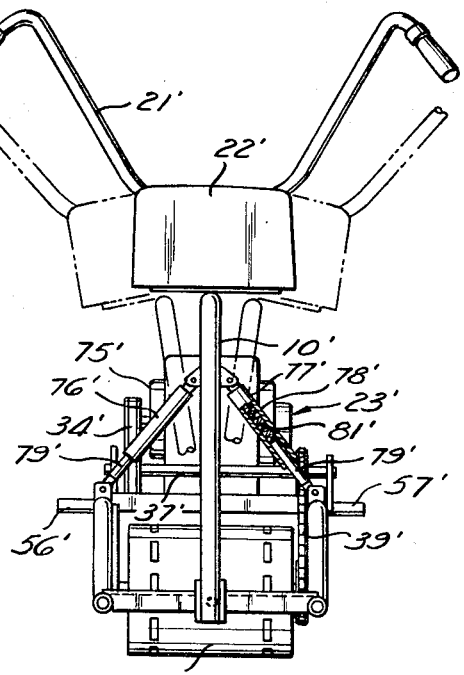
FIG. 5 is a back view of the vehicle shown in FIG. 4 again illustrating the manner in which the main frame may be pivoted in either direction about the longitudinal axis.
Figure 4:
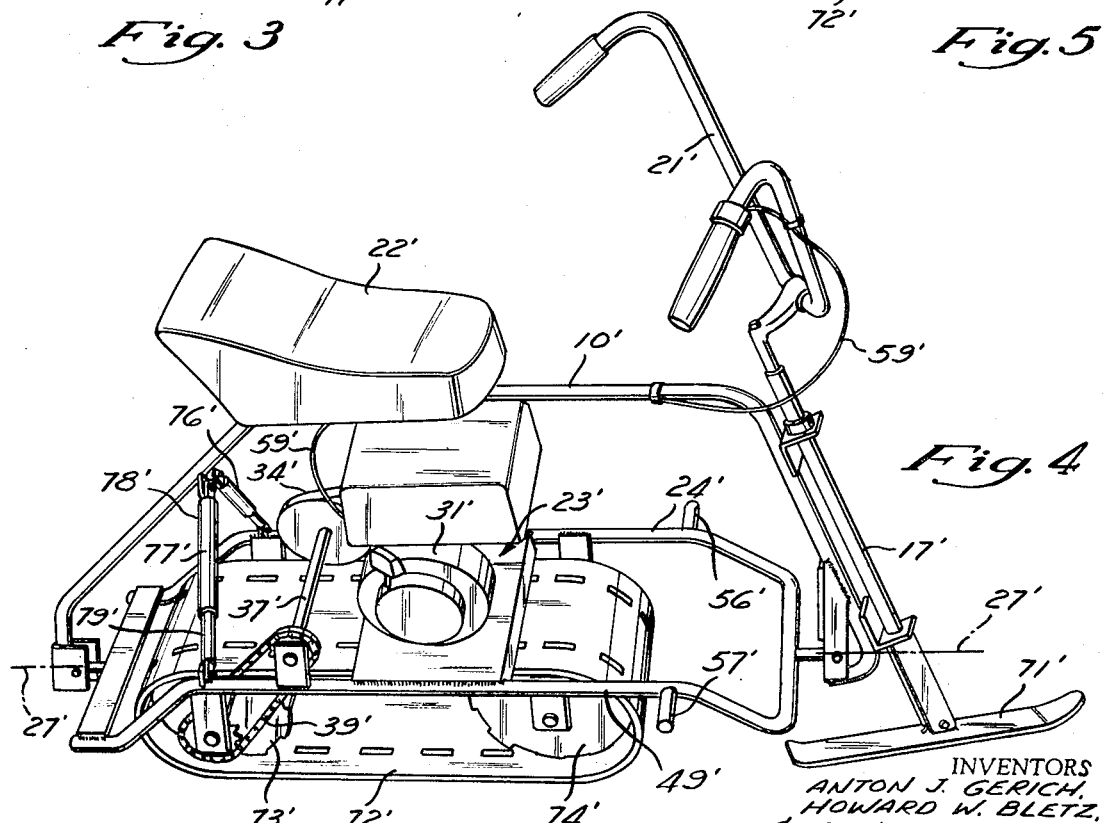
FIG. 4 is a perspective view of a second embodiment of this invention illustrating a vehicle intended primarily for operation on snow.

FIGS. 4 and 5 illustrate a second embodiment which is particularly suited for operation on snow. In this embodiment similar reference numerals will be utilized to designate similar elements with a prime (') added to indicate reference is made to the second embodiment. Here again, a main frame 10' is pivotally connected at its rearward end to a power unit 23' for relative rotation about a longitudinal axis 27'. In this instance a steerable ski 71' is mounted on the steering column 17', and the power unit provides a powered track 72' which passes over end rollers 73' and 74'. The engine 31' again drives the traction systems through a jackshaft 37' and a chain 39' connected to the roller 73'. In this embodiment a simple pivot is provided at each end of the frames so the weight on the track unit 72' is not controlled by the operator's feet. Instead, a centrifugal clutch 75' is provided between the engine and the belt 34'. However, the power unit frame 24' is again provided with footrests 56' and 57' on opposite sides of the longitudinal axis 27' so that the operator can place his feet on a stable platform and balance by the use of his feet without placing his feet on the ground.

In this embodiment, a pair of spring assemblies 76' and 77' are connected between the main frame 10' and the power unit frame 24'. Each spring assembly includes a tube 78' pivoted at its upper end on the main frame 10' and a rod or plunger 79' which telescopes into the associated tube. Each plunger is pivoted at its lower end on the power unit frame and a compression spring 81' is positioned within each tube to produce a spring force urging the associated plunger in an extending direction. The two spring assemblies are diagonally mounted in opposite directions as best illustrated in FIG. 5 so that they cooperate to produce centering spring forces tending to maintain the main frame perpendicular to the power unit frame.

When the operator tips the main frame with respect to the power unit frame, the value of the centering force is increased. Therefore, when the operator tips the main frame to lean into a turn, the springs function to produce a resulting force on the power unit frame tending to press downwardly on the side of the frame on the inside of the turn. This tends to overcome the centrifugal force of the turn produced by the mass of the power unit frame and prevents such force from either tipping the power unit frame over or causing a higher loading on the outside edge of the track 72'. The springs are preferably sized so that an even distribution of load on the track is maintained. Since the angle of leaning of the operator is a direct function of the centrifugal force created by the turn and since the spring force is also a direct function of the angle to which the operator leans into the turn, it is possible to select a spring rate which tends to maintain an even loading on the track.

The springs also provide improved stability when the vehicle is operated over a lateral slope. In such instance, the operator maintains the main frame in a substantially upright position while the power unit frame tips to conform to the lateral slope. Here again, the springs function to overcome any tendancy for the power unit frame to tip over, and they maintain a relatively uniform loading of the track. With such springs, greatly improved stability is achieved, and it is not necessary to provide an excessively wide track to insure stability.

Even when the springs are used, however, it is desirable to locate the pivot axis 27 relatively low since such location of the pivot also contributes to the stability of the vehicle. Further, the location of the pivot axis 27' and the width of the track are preferably arranged so that the line of action of any force applied to the track from the main frame through the pivot is within the tread width of the track under normal operating conditions.

A steerable wheel (not illustrated) is substituted for the steerable skies 71' when it is desired to operate the vehicle over bare ground. This vehicle, because it utilizes a track, is capable of operating over substantially all types of terrain and may even be used on ice by providing a cutting edge on the ski 71' or by substituting a skate for the ski 71'.

Since the operator places his feet on a stable platform provided by the power unit when the vehicle is operating, improved stability is provided, and the likelihood of injury to the operator is substantially decreased.

Although preferred embodiments of this invention are illustrated, it is to be understood that various modifications and rearrangements of parts may be resorted to without departing from the scope of the invention disclosed and claimed herein.

What is claimed is:

1. A vehicle comprising a frame adapted to support an operator, a steerable terrain-engaging support element mounted on one end of said frame, a propelling unit pivotally connected to said frame for relative rotation about a longitudinal extending pivot axis, said propelling unit including terrain-engaging traction means and power means connected to drive said traction means, said traction means operating to engage said terrain at laterally spaced portions on both sides of said axis so that said power unit is laterally stable on the terrain, said frame being tippable about said axis with respect to the terrain and said propelling unit so that an operator can lean when the vehicle turns, said propelling unit providing a footrest on each side of said axis permitting an operator to control with his feet the position of said frame with respect to said propelling unit while said vehicle is in motion, and spring means connected between said frame and propelling unit which are operable to produce a centering force tending to maintain said frame in an upright position with respect to said propelling unit, said centering force being a direct function of the angle from the upright position of said frame with respect to said propelling unit.

2. A vehicle as set forth in claim 1 wherein said traction means is a track mechanism operable to engage the terrain and support the portion of the vehicle not supported by said support element.

3. A vehicle comprising a frame adapted to support an operator, a steerable terrain-engaging support element mounted at one end of said frame, a propelling unit pivotally connected to said frame for relative rotation about a longitudinally extending pivot axis, said propelling unit including a track mechanism operable to engage the terrain and support a portion of the vehicle not supported by said support element and power means connected to drive said track mechanism, said frame being tippable about said axis with respect to the terrain and said propelling unit so that an operator can lean when the vehicle turns, and spring means operatively connected between said frame and propelling unit providing a resilient centering force tending to maintain said frame in an upright position with respect to said propelling unit.

4. A vehicle as set forth in claim 3 wherein said spring means are sized and connected so that an even distribution of the load on the track is maintained when an operator leans into a turn when the vehicle is in motion and turning on substantially flat terrain.

* * * * *